Nov. 17, 1964 A. FEINER 3,157,747

AUTOMATIC SELECTING SWITCH

Filed May 10, 1960 3 Sheets-Sheet 1

INVENTOR
A. FEINER
BY S. E. Hollander
ATTORNEY

Nov. 17, 1964 A. FEINER 3,157,747

AUTOMATIC SELECTING SWITCH

Filed May 10, 1960 3 Sheets-Sheet 2

INVENTOR
A. FEINER
BY S.E. Hollander
ATTORNEY

INVENTOR
A. FEINER
BY S. F. Hollander
ATTORNEY 3,157,747
Patented Nov. 17, 1964

3,157,747

AUTOMATIC SELECTING SWITCH

Alexander Feiner, Boonton, N.J., assignor to Bell Telephone Laboratories, Incorporated, New York, N.Y., a corporation of New York Filed May 10, 1960, Ser. No. 28,149
23 Claims. (Cl. 179—27.54)

This invention relates to switching circuits and more particularly to automatic selecting switches utilizing dry-reed elements for use in telephone switching systems.

Various circuits for connecting individual subscribers to paths shared noncoincidentally in common with a number of subscribers, such as trunks leading from line concentrating equipment to a central office or trunks between central offices, have been suggested heretofore. For example, in many recent telephone switching systems a coordinate switch such as that disclosed by J. N. Reynolds in Patent 2,021,329, issued November 19, 1935, is utilized. The Reynolds crossbar switch includes mechanical conducting elements which are connected to individual common paths or trunks and may be physically moved into contact with selected mechanical conducting elements connected to individual subscriber line circuits to electrically connect the subscriber circuitry to utilize a selected one of the paths.

Certain disadvantages are attendant on the use of crossbar switches which include mechanical elements. For example, the inertia of the mechanical elements may render switching operations thereby relatively slow and thus expensive in comparison to certain known types of electrical switching. Mechanical switches are also susceptible to physical wear and may be rendered inoperative thereby. Further, the space required for the physical movements of the mechanical elements in making a connection added to that actually required by the physical members in the static condition may render the switch too large to be economically feasible.

Some mechanical switches are incapable of connecting a plurality of paths to the same line or a number of lines to the same path because the mechanical elements which must physically move for selecting a line and a path must remain in contact to maintain the selected connection therebetween during use. With the selecting elements thus immobilized, no further selection of that path or line can be accomplished. This is disadvantageous in certain instances, for example, in providing for conference-type telephone calls.

With the invention of various electromagnetic switches such as the small, enclosed, dry-reed switches suggested in W. B. Ellwood Patent 2,289,830 issued July 14, 1942, many of the disadvantages of the prior art switches were overcome. For example, the reed switches are small enough so a large number may be arrayed in a small space. The contacts of the switches have little mass and are thus capable of rapid operation. The direct method of magnetic closing applicable thereto allows the addition of simple magnetic latching circuitry to maintain a selected crosspoint switch in the operated condition, thus freeing the selection equipment for making further interconnections between paths and lines, including those already in use.

However, certain problems have arisen in the application of dry-reed switches to crossbar-like selective switching arrangements. For example, in a coordinate arrangement a crosspoint may be selected by the operation of a selecting circuit representing a line and of a selecting circuit representing one of the common paths. To operate a reed switch crosspoint, two coils are normally energized coincidentally to produce fields providing aiding magnetomotive force on the switch contacts, one field being representative of the appropriate line and the other being representative of the appropriate path. To produce such fields, it is necessary either to provide two coils at each reed switch crosspoint, one for each path and one for each line, or to provide a single coil for producing a field adjacent all of the switches connected to each path and another single coil for producing a field adjacent all of the switches connected to each line. The first situation requires the use of a great number of coils (i.e., a number equal to the number of lines multiplied by the number of available paths) and increases the expense of the system, while the crossing of magnetic fields which occurs in the latter situation requires ample isolating material and may increase the unit to an impractical size.

Coordinate switches may advantageously include equipment for making connections between subscriber line circuits and circuits for supervising the condition thereof. A line supervising circuit may provide an auxiliary circuit for completing the subscriber line circuit when that line circuit is not completed by connection to one of the common paths. When a complete circuit is provided it furnishes a means for alerting a central office when a subscribed desires service. In many telephone systems, however, the line supervisory equipment may include an inexpensive line relay operated by windings connected across the line circuit and to a source of potential. Because these windings if connected during line use may provide imperfect isolation from ground and dissipate speech currents, because the potential source connected to these windings may degrade direct-current measurements taken on a line through a completed path, and because disconnection of the supervisory equipment is capable of producing a useful change-of-state indication, it is desirable to disconnect the supervisory circuits when a line is connected and to connect the supervisory circuit when the line is out of use. In prior art coordinate switches, the equipment utilized for this operation has been relatively complicated and included the various disadvantages of the prior art selecting equipment noted heretofore.

It is, therefore, an object of this invention to provide a selective switch offering the advantages of both mechanical and magnetic selection without the disadvantages thereof.

Another object of this invention is to provide a selective switch wherein a minimum number of magnetic fields may be utilized for selection purposes without interference, one with the other.

An additional object of this invention is to reduce the size and complexity of selective switches.

It is a further object of this invention to eliminate circuit redundancy by operating supervisory cutoff switches, utilized to connect and disconnect line supervisory circuits and subscriber line circuits, in a manner to utilize selection equipment.

Another object of this invention is to provide a selective switch wherein any number of lines or trunks may be interconnected without disabling the selecting operation of the switch.

Briefly, these objects are accomplished in accordance with aspects of this invention by a selective switch which utilizes dry-reed crosspoints such as disclosed in the Ellwood patent mentioned supra, the operation and selection of which are controlled by a combination of magnetic and mechanical equipment. In the coordinate switch of this invention, a plurality of pairs of dry-reed switches are associated in a coordinate arrangement of rows and columns, the first terminals of the switches of any column being electrically connected respectively to the tip and ring conductors of a single subscriber line circuit to provide balanced switching, the second terminals of the switches of any row being electrically connected to tip and ring conductors of a single common utilization path, such as a trunk from a concentrator to a central office or a trunk connected between central offices. Hereinafter, the common paths will be described generically as trunks to better distinguish from associated circuitry.

To obtain the advantages of both mechanical and magnetic switching, selection is accomplished by mechanical equipment in one coordinate and magnetic equipment in the other coordinate. A single line select coil is associated with all of the reed switches connected to any one subscriber line by a magnetic flux extending path, such as a soft iron bar. A trunk selecting mechanism, of soft iron or the like, is arranged adjacent the opposite ends of all reed switches connected to a single trunk. In the normal nonselect position of the trunk selecting mechanism, the energization of a line select coil provides a field in the space about all of the red switches associated therewith insufficient to operate any of those switches. Equipment is provided for individually moving each trunk selecting mechanism into closer relation with the reed pairs of the row adjacent. This reduces the magnetic reluctance in the area of the selected switch and diverts sufficient magnetic flux therethrough to operate that pair of switches.

Since magnetic selection takes place in only the line coordinate, all of the switches connected to a single line may be arranged in parallel and easily isolated magnetically so that they may be operated by a field from the same coil with no interference between magnetic fields.

In a first embodiment, the pairs of reed switches are associated in a rectangular coordinate arrangement, the pairs connected to the lines lying in parallel planes in a first coordinate, the pairs connected to the trunks or utilization paths lying in parallel planes perpendicular to the line planes. To operate (coincidentally) a pair of switches to connect a line to a path, the trunk selecting mechanism, a bar, is moved closer to the row of switches connected to the selected trunk and the line select coil of a single line is energized. The movement of the bar reduces the reluctance of the magnetic path of the chosen line select coil through the selected pair of switches to a degree that the field becomes sufficient about that pair to accomplish the operation thereof. A strip of permanent magnetic material may be positioned adjacent to the reed pairs connected to any line for accomplishing latching (holding switches in selected states after selection has been accomplished). The reed switches are opened or closed depending on the direction of the current establishing the field of the line select coil.

The connection or disconnection of line circuit supervisory equipment to the line upon the operation to disconnect or connect any trunk to that line is accomplished by an advantageous utilization of the line selection fields. Since, as outlined supra, it is desirable in some telephone systems to disconnect the supervisory equipment when a line is connected to a common path, and vice versa, the circuit changes occasioned by the line selection operation may be used to initiate the supervisory change. In this invention, an additional dry-reed pair connecting the line to its supervisory equipment is interposed to sample the magnetic field of the line selection path of each line. This additional pair is adapted to operate upon the energization of the line select coil of that line and any selecting bar. The operation, however, is in a sense opposite to the operation of the other dry-reed switches connected to the line due to the unique arrangement of reed switches, magnetic flux paths, and permanent magnetic latching strips. Because the line selecting fields are so utilized, only a single piece of equipment, the cutoff pair, need be added to each line of the coordinate switch of this invention to allow that switch to accomplish connection and disconnection of the line and supervisory equipment.

A second embodiment of the coordinate switch of this invention offers certain additional advantages including advantages directed to the reduction of flux loss and improvement of operating margins. In the second embodiment, the pairs of reed switches connected to a line are physically arranged in a semicircular plane, the end of each switch towards the center thereof being electrically connected to the line and closely associated in a magnetic sense with the line select coil thereof. The outer ends of the switches, on the other hand, are electrically connected to the individual trunks and are adapted for association by mechanical selecting equipment with a half-cylinder magnetic flux return path to the line select coils. Individual mechanical members, each comprising a number of vane-like elements (equal to the number of lines) mounted on a rotating shaft, associated with individual trunks accomplish selection of the proper trunk. Each mechanical member is adapted to rotate, from a position dissociated from the half-cylindrical return path and the reed switches, into contact with the return path and nearer to the reed switches connected to the selected trunk in a manner to reduce the magnetic reluctance through those switches and allow the field of an energized line coil to operate the selected pair. As in the first embodiment, permanent magnetic latching strips and supervisory cutoff switches which utilize the magnetic fiields of the line selection coils may be provided.

A feature of this invention pertains to the structural combination of magnetic and mechanical selecting elements providing the most advantageous use of both types of selection.

Another feature of this invention relates to the use of a single line select coil to operate all the dry-reed switches connected to a line thereby reducing the number of coils necessary for selection purposes. This is possible because of the use of mechanical elements which provide physical paths to direct the magnetic fields produced by the line coils in return path, which do not cross and interfere with each other or with selecting paths, as in prior arrangements.

An additional feature of this invention relates to the use of a movable member associated with a common path to accomplish the selection of a predetermined magnetically-operable switch by reducing the reluctance of the magnetic path therethrough.

Another feature of this invention pertains to the arrangement of a dry-reed switch to utilize the fields of line selection coils for connecting and disconnecting supervisory equipment and a subscriber line circuit.

Another feature of the invention relates to the arrangement including latching strips and switching pairs in a manner to provide operation in an opposite sense of crosspoint pairs and cutoff pairs connected to a line by means of the equipment used for the selecting operation.

As is obvious from the foregoing general description and features, the crossbar switch of this invention utilizes both magnetic and mechanical selecting elements in arrangements adapted to provide the advantages of both types of selection. The arrangements allow a reduction in the physical size of selective switches, eliminate interference between magnetic selecting fields, allow a reduction in the number of necessary elements, eliminate the redundancy normally found in supervisory circuit connection equipment, and allow a plurality of lines to be interconnected with a single trunk.

These and other objects, features and advantages of this invention will be better understood from a consideration of the following description read in accordance with the attached drawing, in which.

Figure 1:
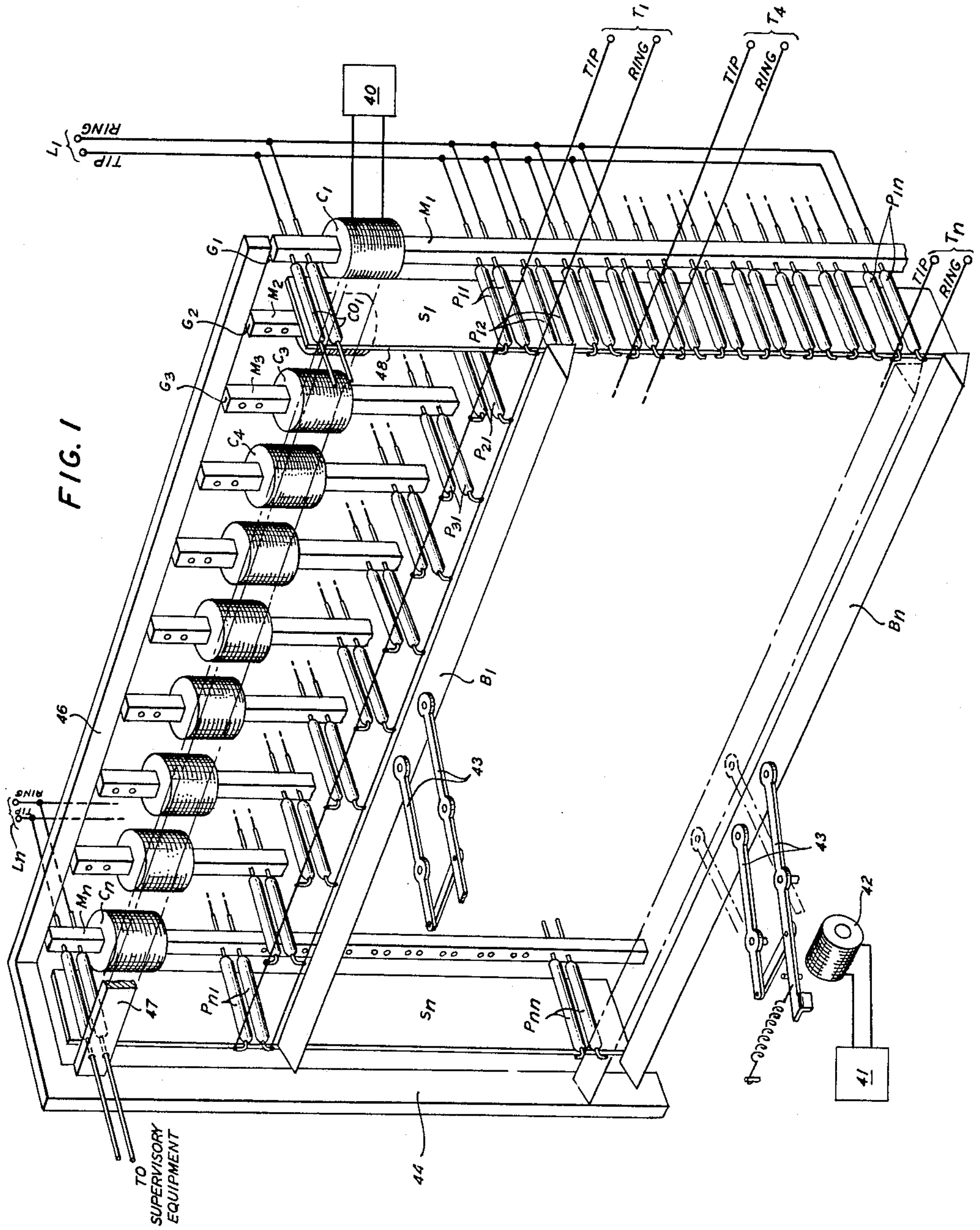
FIG. 1 is a partial perspective view of a rectangular coordinate switch embodying features of this invention.

Referring now to FIG. 1 there is shown a first rectangular embodiment of the coordinate switch of the invention. A plurality of pairs P of the well-known magnetically-soft, glass-enclosed, dry-reed switches, illustratively of the type disclosed in W. B. Ellwood Patent 2,289,830, mentioned supra, which may be operated by the application of appropriate magnetic fields to the contact members, are associated in row and column arrangement. It is to be noted that in the method of designation chosen herein the first sub-numeral of any pair P represents the subscriber line to which the pair is electrically connected while the second sub-numeral represents the trunk to which the pair is electrically connected, e.g., $P_{12}$ is the pair at the intersection of line one and trunk two. Other elements to be mentioned hereinafter are generally sub-numbered in a like manner to indicate association with a distinct line or a distinct path. Thereinafter, for ease of description, the physical arrangement of all the switches connected to a line is designated as a column; and the arrangement of those connected to a trunk is designated as a row.

Each pair of switches P in each column may be electrically connected at a first terminal to the tip and the ring conductors of one of a number of subscriber's line circuits L. The other terminals of each pair P in any row may be electrically connected to the tip and ring conductors of one of a plurality of trunks or paths T connecting to or between a central office, not shown. A pair of switches are provided at each crosspoint to furnish a balanced condition; obviously a single switch might be used where balance poses no problem. When the contacts of any pair of switches P are closed a selected line circuit L will be physically connected to a selected trunk T. Any desired subscriber line circuit L may be connected to any one of the number of trunks T merely by operation of the correct pair of switches P interconnecting the chosen trunk T and line L. For example, the line $L_1$ may be connected to the trunk $T_1$ by closing the pair $P_{11}$.

To accomplish the selection, a line selection coil C is associated by a number M with each of the plurality of pairs of switches P connected to a line L. The members M may advantageously be of a material such as soft iron capable of providing a low reluctance path for extending magnetic flux. The energization of one of the line selection coils C produces a flux through the associated one of the paths M and a magnetic field in the area of the associated pairs of switches P. This field is normally directed so it is incapable of operating the associated pairs of switches P. The pairs P associated with a member M may advantageously be supported thereby while being electrically insulated therefrom. The direction of the field produced by a coil C is determined by the direction of current furnished by an energizing source 40.

A number of trunk selection bars B of a material capable of providing a low reluctance magnetic flux path are arranged parallel to the rows of switches adjacent the ends thereof dissociated from the members M. Equipment, such as a solenoid 42, an energizing source 41, and a linkage element 43, is provided to move a selected bar B, for example, bar $B_1$, into closer relation with the pair of switches P of the adjacent row.

To aid in furnishing an easy path for extending magnetic flux, the bars B may advantageously be arranged to abut, upon the movement thereof in contact with a return path 44 also of a material such as soft iron.

It is to be noted that the trunk selection bars B may have a triangular cross section, as shown, to reduce weight and thus inertia while maintaining the largest surface possible facing the pairs P for reducing the magnetic reluctance therethrough. The reduction of inertia enables the mechanical selection to be accomplished rapidly.

To complete the return path 44 to the coils C, an additional low reluctance path 46 is provided, associated with all of the members M by air gaps G. In addition, a number of pairs of switches CO may be provided to facilitate the operation of the crossbar switch of this invention. A pair CO is associated with each one of the magnetic members M by interposing each switching pair CO between one member M and a permanently mounted low reluctance path 47 connected to the path 44 in parallel with the return path 46. Each pair CO electrically connects the equipment, not shown, for supervising the on- or off-hook condition of the line to the line circuit. Each pair CO is arranged to operate upon any energization of the coil C associated therewith and a trunk selecting bar B, but, as will be explained hereinafter, in opposite logical sense to the other pairs of switches P connected to the line L.

A series of permanent magnetic strips S are provided, each parallel and adjacent to a column of pairs of switches P and CO, for holding an operated pair of switches in the operated position so that the selecting means (coil and bar) may be de-energized and used for further selection while maintaining the connection of the selected switches.

An exemplary selection of a crosspoint to connect a selected line to a selected trunk is as follows. To connect the line $L_1$ to the trunk $T_1$ the pair of switches $P_{11}$ must be closed. In addition, as explained supra, it is desirable to disconnect supervisory equipment from a line in use to preclude various undesirable effects which may occur if the connection is maintained, such as loss of speech current through the shunt path of the supervisory equipment. Since the line $L_1$ is to be used, the pair of switches $CO_1$ should therefore be opened to disconnect the supervisory circuitry normally connected to line $L_1$ in the unused state.

Equipment, not shown in detail but which may be of a type such as the source 41, the solenoid 42, and the linkage 43, attached to the bar $B_1$ is operated to move the bar $B_1$ nearer the pairs of switches $P_{11}$–$P_{n1}$ in the row adjacent thereto. The bar $B_1$ may advantageously move to a position abutting the return path 44 to provide a complete flux path therebetween.

Figure 2:
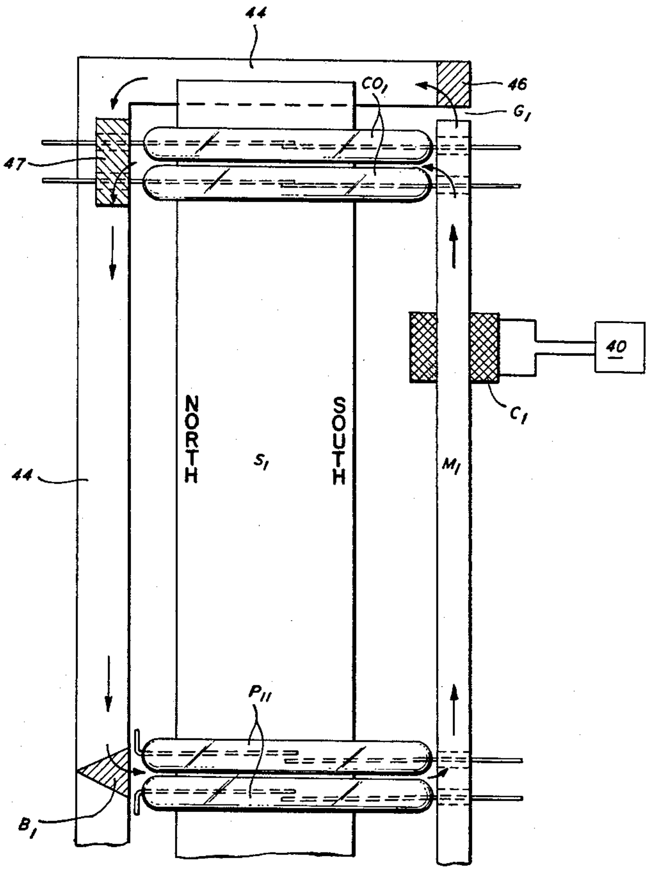
FIG. 2 is a partial side elevation view of the switch of FIG. 1, useful in describing the detailed operation of selection.

Reference is now made to FIG. 2 to explain the detailed operation for opening and closing the switches. FIG. 2 is a partial side elevation view of the coordinate switch of FIG. 1, describing a single switching pair $P_{11}$ and a single cutoff pair $CO_1$ of dry-reed switches. Before selection takes place the pair $P_{11}$ is open while the pair $CO_1$ is closed, as shown.

Coil $C_1$ is associated with the first terminals of the pairs $P_{11}$ and $CO_1$ by the flux extending member $M_1$ which may advantageously support those terminals in electrically insulated holes, as shown. The bar $B_1$ is assumed in FIG. 2 in its selecting position nearer the pair $P_{11}$ so that pair $P_{11}$ is selected. A low reluctance flux path extends, as shown by arrows, in parallel through the air gap $G_1$ and the pair $CO_1$ to the return path 44 and thence through the bar $B_1$ and the pair $P_{11}$ to the member $M_1$. When the bar $B_1$ is in the normal nonselecting position, the reluctance of the flux path through the mechanical members including the return path 44 is substantially greater than the normal field distribution path in the air about the member $M_1$. Any flux in the member $M_1$ therefore follows the latter normal path when the bar $B_1$ is in the nonselecting position and there is no appreciable amount of flux in the mechanical path. However, when the bar $B_1$ is moved closer to the pair $P_{11}$ and abuts on the return path 44 the magnetic reluctance of the mechanical flux path (through the pair $CO_1$ and the air gap $G_1$ in parallel therewith, the return path 44, the bar $B_1$, and the pair $P_{11}$) is reduced below that of the normal field distribution path, and a substantial amount of any flux in the member $M_1$ flows in the mechanical path including the pair $P_{11}$ and the pair $CO_1$.

It is well known that the flux in a magnetic path determines the magnetic potentials (the magnetomotive forces) of the various points in that path and the attractive force exerted therebetween. The greater the flux in a path, the greater the attraction between points thereof. When the fields of two flux sources are superimposed so that fluxes from the two sources flow in the same path, the resulting flux from the two fields determines the attractive force on two switching contacts in that resulting flux path which will increase as the resulting flux increases.

The permanent magnetic strip $S_1$ is positioned adjacent both of the pairs $P_{11}$ and $CO_1$ and is polarized such that its north magnetic pole extends along the side thereof toward the left terminals of pairs $P_{11}$ and $CO_1$, as viewed in the drawing, and its south pole extends along the side toward the right terminals of pairs $P_{11}$ and $CO_1$. The magnetic field of the strip $S_1$ may advantageously furnish an attractive force on the contacts of the pairs $P_{11}$ and $CO_1$ inadequate to close an open pair but adequate to maintain the pairs $P_{11}$ and $CO_1$ in the closed position. It is assumed for purposes of illustration that twice the flux furnished by the strip $S_1$ is adequate to close an open pair $P_{11}$ or $CO_1$.

Assuming that the pair $P_{11}$ is initially open and the pair $CO_1$ is closed, as in the normal nonoperating condition of the line $L_1$, to make the selection, the source 40 is energized and the bar $B_1$ is moved near the pair $P_{11}$, as shown. The source 40 provides a current in the coil $C_1$ in a first direction such as to produce flux in the member $M_1$ in the direction of the arrows, that is, to establish a north magnetic pole at the upper end of the member $M_1$ and a south magnetic pole at the lower end thereof.

Thus, when the bar $B_1$ is in the selecting position, flux from the member $M_1$ will flow in the mechanical path including the pairs $P_{11}$ and $CO_1$. Since the flux produced by the coil $C_1$ flows around the mechanical path and in opposite directions through the pairs $P_{11}$ and $CO_1$, it opposes the flux produced by the strip $S_1$ through the pair $CO_1$ and aids that produced by the strip $S_1$ through the pair $P_{11}$. The resulting flux through the pair $CO_1$ is thus the sum of the opposing fluxes while the resulting flux through the pair $P_{11}$ is the sum of the aiding fluxes. The magnetic attraction on the contacts of soft-reed switches, which display no residual magnetism, is determined by the amount of flux; as long as a predetermined amount is present, the magnetic attraction is great enough to close the switches, irrespective of the flux direction.

The source 40 may advantageously supply a current such that in the selecting position of the bar $B_1$, the resulting flux is sufficient to close the contacts of the pair $P_{11}$ and to maintain the contacts of the pair $CO_1$ closed. Since the flux is divided between the pair $CO_1$ and the parallel path including the air gap $G_1$, the flux available to close the pair $CO_1$ is less than that available to close the pair $P_{11}$. Thus the flux produced by the source 40 must be such that the resulting flux through the pair $CO_1$ is approximately twice that furnished by the strip $S_1$ which is sufficient to close or to maintain the pair $CO_1$ closed. If the reluctance of the air gap $G_1$ is adjusted such that it approximates that of the pair $CO_1$ when open, approximately six times the flux of the strip must be produced by the source 40. Assuming that value, the flux due to the source 40 through the pair $CO_1$ will be three times that due to the strip $S_1$ and opposed thereto. The resulting flux is thus twice that of the strip $S_1$ and sufficient to maintain the contacts of pair $CO_1$ closed. The flux through the pair $P_{11}$ is approximately seven times that furnished by the strip $S_1$ alone, and the pair $P_{11}$ closes.

It is to be noted that if the return path 46 is omitted so that all of the flux from member $M_1$ passes through the pair $CO_1$, the source 40 need produce a flux only three times that of the strip $S_1$ to produce a like result.

As the coil $C_1$ is de-energized and the bar $B_1$ withdrawn, the flux supplied by the coil $C_1$ through the contacts of the pairs $P_{11}$ and $CO_1$ is removed since the magnetic reluctance of the mechanical flux path is increased and the current in coil $C_1$ ceases. During the removal of the flux produced by the coil $C_1$ the resulting flux on the pair $CO_1$ reverses in sense and becomes that produced by the strip $S_1$. During the period of that reversal, the flux becomes insufficient to provide adequate attractive force to maintain the contacts of pair $CO_1$ closed, the flux in fact becoming zero at one instant. Therefore during the reversal the pair $CO_1$ opens. After the reversal only the flux provided by the strip $S_1$ is present, and it is incapable of providing sufficient attractive force to reclose the pair $CO_1$. The flux through the pair $P_{11}$ on the other hand is merely reduced from a first high value in one direction to the lower value in the same direction furnished by the strip $S_1$, the attractive force of which is adequate to maintain the contacts of the pair $P_{11}$ closed.

The operation of opening a pair of switches $P_{11}$ is accomplished, like closing, by energizing the appropriate line coil $C_1$ (in the opposite current sense to that required for closing) and moving the appropriate trunk bar $B_1$ closer to the pair $P_{11}$ connected to the appropriate trunk $T_1$. Since the magnetic reluctance of the mechanical path through the selected pair $P_{11}$ only is reduced, only that switching pair $P_{11}$ will be opened and the pair $CO_1$ closed.

When the bar $B_1$ is moved adjacent the pair $P_{11}$ and abuts the path 44, the flux produced by the coil $C_1$ (in the direction opposite to the arrows) flows from the member $M_1$ through the reduced reluctance path including the now-closed pair $P_{11}$, the bar $B_1$, the return path 44, and parallel path, including the now-open pair $CO_1$ and the air gap $G_1$, to the member $M_1$. Since the flux produced in the member $M_1$ is reversed in direction, it aids the flux of the strip $S_1$ about the contacts of the pair $CO_1$ and closes those contacts. While the flux from the member $M_1$ opposes that of the strip $S_1$ about the contacts of pair $P_{11}$, the resultant flux is sufficient to maintain pair $P_{11}$ closed. When the bar $B_1$ is withdrawn and the coil $C_1$ de-energized, the flux through the pair $P_{11}$ reverses, opening the contacts thereof, while the flux through the pair $CO_1$ is merely reduced to that in the same sense furnished by the strip $S_1$, adequate to maintain the pair $CO_1$ closed.

It will be seen that any number of switches P may be closed to connect a plurality of line circuits L to a single trunk T or a plurality of trunks T to a single line L, since either the opening or closing selection operates only the selected switch pair P which is then held in the selected position until another operation is performed on that switch pair P. This feature obviously facilitates the setting up of conference calls in telephone systems.

It is to be noted that the cutoff pairs CO may be removed from the coordinate switch without affecting the operation thereof if the magnetic path 46 is maintained between the return path 44 and the members M. In such a case the small air gaps G separating the added return path 46 and each of the members M are adjusted to reduce possible stray flux paths while maintaining the low reluctance of the mechanical path.

Since the magnetic fields of the coils C are associated with the switches by flux paths M lying in a series of parallel planes and the return flux paths do not cross the paths M but go outside of the planes thereof through the mechanical flux paths, the pairs of switches P connected to any line L may be magnetically isolated from the fields utilized for operating switches of other lines L by extremely simple shielding methods. For example, backing material 48 (as shown in FIG. 1) on the permanent magnetic strips S may be utilized to provide this isolation. In this manner a minimum size may be obtained for the coordinate switch without encountering the interference common to prior art magnetic switches.

Obviously, other types of magnetically-responsive switches might be used instead of the soft-reed switches suggested without varying the basic selection techniques, though the actual closing operation as disclosed in FIG. 2 supra might vary. For example, crosspoint switches responsive to flux direction might be used without the magnetic strips S for similar and for other purposes.

Figure 3:
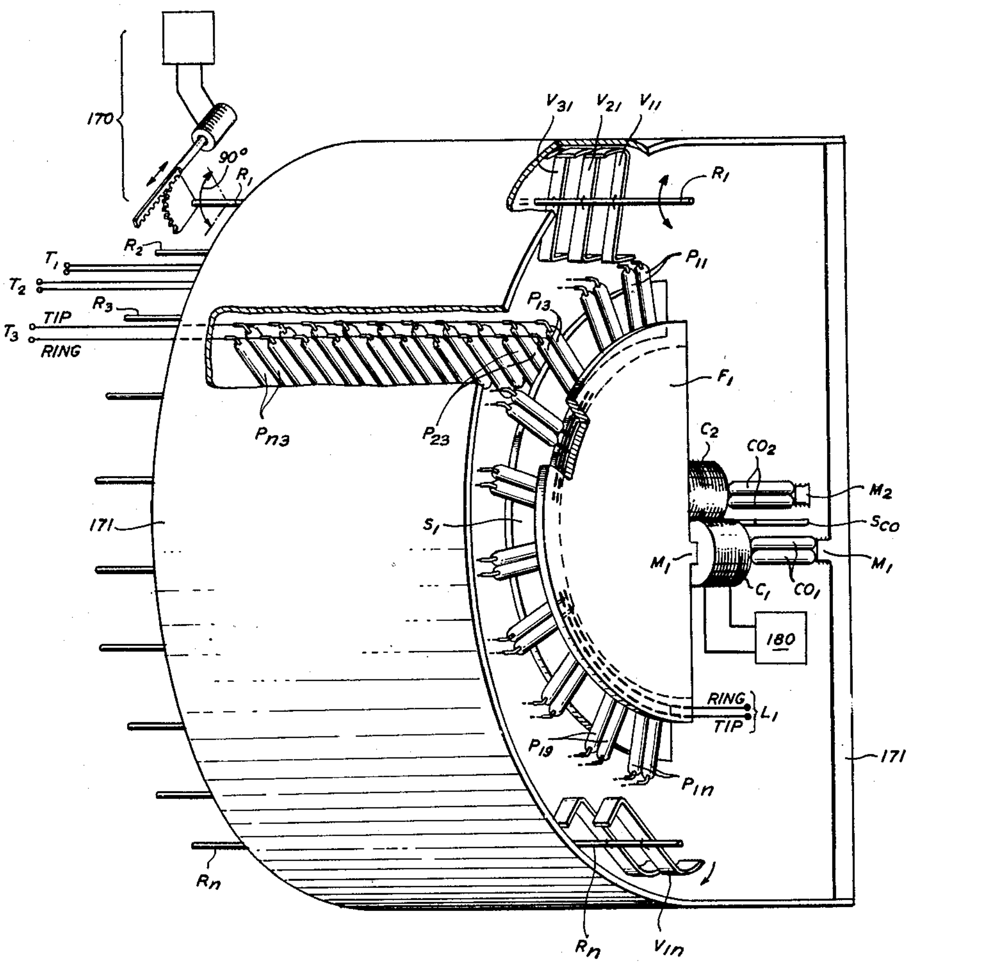
FIG. 3 is a perspective view of a semicircular switch utilizing the structural features of this invention in a manner to provide additional advantages.

Referring now to FIG. 3 there is shown a second, semicircular embodiment of the invention providing certain additional advantages. In the embodiment of FIG. 3, the elements serving identical functions as those in FIG. 1 are given identical letter designations. FIG. 3 is a partial view showing sufficient structure to explain the operation of the switch. In this embodiment all of the pairs of switches P connected to a line L are arranged in a semicircular plane, the inner terminals of the switches being multipled respectively to the tip and ring conductors of the individual lines L and the outer terminals being multipled to the tip and ring conductors of the individual trunks T. Associated with the switches connected to a line L by a low magnetic reluctance member M, of a material such as soft iron, is a line selection coil C. The coils C may advantageosuly be arranged, as shown, in a staggered pattern for closer physical association. The field of any coil C is normally insufficient to produce an attractive force capable of operating any switching pair P associated therewith because of the high magnetic reluctance through the pair P compared to that of the normal field about the member M. The member M may advantageously have a fan-like portion F extending near the pairs P. This portion F may be shaped to partially cover one end of the pairs P to more closely associate the field of coil C therewith. Permanent magnet latching and isolating strips S with insulating back material are provided adjacent and parallel all the pairs P connected to a line L. If desired, cutoff switching pairs CO may be associated with each line L, as in an extended portion of the member M.

A plurality of rotating members R are provided with well-known equipment, such as equipment 170, for rotating each member R by ninety degrees. Each member R has arranged thereon a number of vane-like elements V which, when a member R is rotated, physically contact an outer semicircular and return path member 171 which provides a magnetic flux return path to the coils C. The ends of the elements V opposite the member 171 are rotated near the pairs of switches P associated with a trunk T and effectively associate the path 171 in closer relation with the coils C to reduce the magnetic reluctance of the flux path through a pair P connected to an energized coil C, thereby to operate that switching pair P. The elements V may advantageously be shaped in a manner to provide a large surface adjacent the chosen pair P for maximum reduction of reluctance through the pair P to the path 171 while adding little additional physical substance to maintain inertia at a minimum.

Also as in the prior embodiment, any number of switches may be opened or closed to interconnect a plurality of lines L and trunks T. In addition, the shorter magnetic path provided by the semicircular member 171 and the positioning of all pairs P at equal distances from the coil C reduce the possibility of flux loss and improve operating margins.

A typical selection of a crosspoint to connect a line $L_1$ to a trunk $T_1$ would be as follows. Equipment 170 is operated to rotate the member $R_1$ by 90 degrees such that the upper vane $V_{11}$ on member $R_1$ abuts against the return path 171 and has one end near the outer terminals of the pair $P_{11}$. The energization of the coil $C_1$ is then accomplished by means of a source 180 which provides current in a direction such as to estabilsh a flux aiding that of the strip $S_1$. This flux will seek the low reluctance mechanical path through the pair $P_{11}$ and is advantageously adapted to be approximately three times that furnished therethrough by the strip $S_1$. With the reduced reluctance through the pair $P_{11}$ the flux path is completed from member $M_1$ through the pair $P_{11}$, the upper vane $V_{11}$ on member $R_1$, the return path 171 back through the pair $CO_1$ to the member $M_1$. It is to be noted that an additional permanent magnetic strip $S_{CO}$ is provided adjacent all of the pairs CO, producing a field opposed in sense to the strips S, for operating the pairs CO in an opposite sense. The operation to close the switching pair $P_{11}$ is substantially like the operation described in FIG. 2 except that the cutoff switching pair $CO_1$ is in series with the mechanical flux path. The pair $P_{11}$ remains closed and the pair $CO_1$ opens when the coil $C_1$ is de-energized and the member $R_1$ is rotated out of the selecting position. By rotating the member $R_1$ into the selecting position and energizing the coil $C_1$ by current of opposite sense, opposite flux and force are occasioned through the pairs $P_{11}$ and $CO_1$ and, on the removal thereof, the pair $P_{11}$ will be opened and the pair $CO_1$ closed.

It is to be understood that the above-described arrangements are only exemplary of the principles of this invention. Numerous other arrangements may be devised by those skilled in the art without departing from the spirit and scope of the invention.

What is claimed is:

1. A switch for individually connecting a plurality of telephone subscriber line circuits to any of a plurality of electrical paths comprising a plurality of magnetically-operated switches associated in row and column arrangement, said switches in any one of the columns being connected between one of said line circuits and all of said paths, said switches in any one of the rows being connected between one of said paths and all of said line circuits; a plurality of magnetic-field-producing means each magnetically associated with all of the switches of one of said columns; a plurality of mechanical means each associated with all of said switches in one of said rows; and means for individually moving each of said mechanical means to operate any switch adjacent thereto associated with an energized one of said magnetic-field-producing means.

2. A switch as in claim 1 wherein said plurality of magnetic-field-producing means each includes a coil, means for energizing said coil, a low reluctance flux path associated with said coil for associating the field of said coil with all of said switches of said associated column.

3. A switch as in claim 2 wherein said plurality of mechanical means each comprises a low reluctance member positioned adjacent all of said switches of the associated row.

4. A switch as in claim 2 wherein said plurality of mechanical means each comprises a rotatable element parallel and adjacent to one of said rows, a plurality of low reluctance flux-directing members mounted thereon adapted to move into closer association with the switches of said one row on rotation of said element, and a low reluctance return path for contacting all of said low reluctance flux-directing members on rotation of said element.

5. A switch as in claim 2 further comprising an additional plurality of magnetically operated switches each associated with one of said coils and operable to function in a logically opposite sense to any one of the other switches associated with said coil being operated upon by the energization of said coil.

6. A crossbar switch comprising a plurality of magnetically-operable switches for individually connecting a first plurality of electrical circuits to a second plurality of electrical circuits, said switches being physically associated in a coordinate arrangement of parallel and perpendicular planes; means for producing individual magnetic fields and for associating each of said fields with all of said switches lying in one only of said planes in a first coordinate; and means for mechanically reducing the magnetic reluctance of the flux paths passing through all of said switches in individual ones of said planes in a second coordinate.

7. A crossbar switch as in claim 6 further comprising an additional plurality of magnetically-operable switches, each associated with one of said magnetic fields and operable in response thereto in an opposite sense to all other switches associated with said one of said fields.

8. A coordinate switching arrangement for connecting a first plurality of electrical circuits to a second plurality of electrical circuits comprising a plurality of switching means arranged in parallel and perpendicular planes, each of said switching means being operative to close in response to a predetermined magnetic flux therethrough in a first sense and to open in response to a predetermined magnetic flux therethrough in a sense opposite said first sense; a plurality of means for selectively producing magnetic flux in a first and in an opposite sense, each of said flux-producing means being individually associated with all of the switching means in a respective one of said planes of a first coordinate; and a plurality of mechanical means each for directing flux produced by any one of said flux-producing means through said switching means in a respective one of said planes of a second coordinate.

9. A selective switching arrangement for connecting a first plurality of electrical circuits to a second plurality of electrical circuits comprising a plurality of switching means arranged in rows and columns, each of said switching means being operative to close in response to a predetermined magnetic flux therethrough in a first sense and to open in response to said predetermined magnetic flux therethrough in an opposite sense; a plurality of means for producing magnetic flux in a first and in an opposite sense, each of said flux-producing means being magnetically associated with all of said switching means in one of said columns in a manner such that the flux directed through any of said associated switching means is insufficient to operate said switching means; and a plurality of mechanical means, each of said mechanical means being associated with all of said switching means in one of said rows and being operable for directing flux produced by individual ones of said flux-producing means through said switching means of said associated row.

10. A selective switching arrangement as in claim 9 wherein each of said plurality of means for producing magnetic flux comprises a first low reluctance flux-directing member associated with all of said switching means of one of said columns, a coil associated with said first flux-directing member for producing flux therein, and means for furnishing current to energize said coil; and each of said plurality of mechanical means comprises a second low reluctance flux-directing member joining to all of said first flux-directing members through said associated row of said plurality of switching means, and means for physically associating said second member in closer relation with said switching means of said associated row.

11. A selective switching arrangement as in claim 10 wherein each of said first low reluctance flux-directing members includes one of a second plurality of switching means magnetically associated therewith and with all of said plurality of second low reluctance flux-directing members in a manner to open in response to said predetermined flux therethrough in said first sense and to close in response to said predetermined flux therethrough in said opposite sense.

12. A coordinate switching arrangement for connecting individual ones of a first plurality of electrical circuits to individual ones of a second plurality of electrical circuits comprising a plurality of soft-reed switches arranged in rows and columns; a plurality of permanent magnetic strips each arranged adjacent all of said switches in one of said columns in a manner to provide a magnetic flux in a first sense with respect to all of said adjacent switches; a plurality of means for producing magnetic flux in said first and in an opposite sense, each of said flux-producing means comprising a first low reluctance magnetic flux path associated with all of said switches in one of said columns, a coil associated with said first flux path for producing flux therein, and means for energizing said coil; a second low reluctance, magnetic flux return path associated with all of said first paths; and a plurality of mechanical means each associated with all of said switches in one of said rows, and being operable for physically associating said return flux path in closer relation with said switches of said associated row for directing flux from said flux-producing means therethrough.

13. A coordinate switching arrangement as in claim 12 further comprising a second plurality of soft-reed switches, and wherein each of said second plurality of soft-reed switches is magnetically associated with one of said first low reluctance flux paths, with said return flux path, and with the adjacent one of said magnetic strips.

14. A coordinate switching arrangement as in claim 12 wherein each of said mechanical means comprises a bar of low reluctance material positioned at a first predetermined distance from all of said switches of one of said rows, and selecting means for moving said bar to abut on said flux return path at a second predetermined distance nearer all of said switches of said one row.

15. An arrangement for simultaneously closing a first dry-reed switch and opening a second dry-reed switch comprising in combination with said switches a first low magnetic reluctance member associated with first terminals of each of said switches, a second low magnetic reluctance member associated with second terminals of each of said switches, permanent magnetic means associated to produce a flux in a like sense in each of said switches sufficient to maintain said switches closed but insufficient to initiate the closing of said switches, and means for producing a flux in said first low magnetic reluctance member sufficient to initiate the closing of said switches.

16. An arrangement as in claim 15 wherein said first and second members each comprises a soft iron member; and wherein said means for producing flux comprises a coil wound about said first member, and means for producing current in said coil.

17. A coordinate arrangement for completing individual ones of a first plurality of electrical circuits with individual ones of a second plurality of electrical circuits comprising a plurality of pairs of dry-reed switches arranged in rows and columns; a plurality of permanent magnets each arranged adjacent all of said pairs in one of said columns to provide magnetic flux in a first sense in all of said switches in said adjacent pairs; a plurality of low reluctance members each positoned adjacent all of said pairs of one of said columns; a plurality of coils each wound about one of said members; means for individually producing current in each of said coils; a low reluctance magnetic return path associated with all of said plurality of low reluctance members; a plurality of low reluctance bars each associated with all of said pairs of switches in one of said rows, one of said bars being connected to said return path and closely associated with all of said pairs of one of said rows; and means for individually moving the others of said bars to abut said return path in like close association with said pairs of the adjacent ones of said rows.

18. A switching arrangement of switches for connecting any of a first plurality of circuits to any of a second plurality of circuits comprising a first plurality of pairs of dry-reed switches associated in row and column arrangement, said pairs in each of said columns being associated in a semicircular arrangement; a plurality of low reluctance members each associated with all of said pairs in one of said columns at the center of the semicircular arrangement; a plurality of permanent magnets each associated in like sense with the switches in one of said columns; a plurality of coils each wound about one of said low reluctance members; means for energizing each of said coils; a low reluctance return path to all of said low reluctance members, said return path comprising an outer semicircular shell surrounding all of said pairs, and a plate connecting said shell to all of said low reluctance members; a plurality of rotating elements positioned between said shell and said pairs, each of said elements being positioned parallel and adjacent to one of said rows; a plurality of flux extending conductors mounted perpendicularly on each of said elements; and means for individually rotating each of said elements to position said flux extending conductors mounted thereon in close association with said pairs of the adjacent one of said rows and in contact with said shell.

19. A switching arrangement as in claim 18 further comprising a second plurality of pairs of dry-reed switches, each of said pairs being mounted between said plate and one of said low reluctance members; and a permanent magnet associated in a like sense with all of the switches of said second plurality of pairs.

20. A selective switching arrangement for connecting a first plurality of electrical circuits to a second plurality of electrical circuits comprising a plurality of dry-reed swtiches arranged in a first group of parallel planes and in a second group of parallel planes perpendicular to said first group of planes, means for producing and associating magnetic flux in a first and in an opposite sense with all of said switches in individual ones of said planes in said first group, a plurality of mechanical means each associated with all of said switches in individual ones of said planes in said second group, means for individually moving said mechanical means closer to said switches associated therewith to direct an operating flux through said switches associated with an operated one of said flux-producing means, and means for maintaining said switches operated upon the disabling of said mechanical and flux-producing means.

21. A selective switching arrangement as in claim 20 wherein said maintaining means comprises a plurality of permanent magnets each positioned adjacent all of said switches in one of said planes in the first coordinate.

22. A selective switching arrangement capable for connecting a plurality of telepehone subscriber lines to any one of a number of electrical paths to facilitate establishing conference calls comprising a plurality of dry-reed switches, each of said switches connecting one of said lines to one of said paths; mechanical means operable for providing a low magnetic reluctance through all of said switches connected to one of said paths; means operable for selectively producing magnetic fields, each of said fields being associated with all of said switches connected to one of said lines and being sufficient to operate any of said switches having a low magnetic reluctance therethrough, whereby all of said lines associated with operated ones of said field-producing means are connected to said one path; and means for maintaining said switches operated upon the disabling of said mechanical means and said field-producing means.

23. A selective switching arrangement as in claim 22 wherein said mechanical means comprises means for associating a low reluctance member in close relation with all of said pairs connected to one of said electrical paths, and said field-producing means includes, a plurality of coils, means for energizing each of said coils, and means for associating the field produced by each of said coils with all of said pairs connected to one of said lines.

References Cited in the file of this patent

UNITED STATES PATENTS

| | | |
|---|---|---|
| 2,322,851 | Kalb | June 29, 1943 |
| 2,341,029 | Field | Feb. 8, 1944 |

FOREIGN PATENTS

| | | |
|---|---|---|
| 807,398 | Great Britain | Jan. 14, 1959 |